Feb. 4, 1969 G. A. RING 3,426,160

TELEPHONE HANDSET

Filed Oct. 11, 1965

Inventor
Gustav Alfred Ring
Stevens, Davis, Miller & Mosher
Attorneys

United States Patent Office 3,426,160

Patented Feb. 4, 1969

3,426,160
TELEPHONE HANDSET

Gustav Alfred Ring, Volvat, Oslo 3, Norway

Filed Oct. 11, 1965, Ser. No. 494,546
Claims priority, application Norway, Oct. 19, 1964, 155,201
U.S. Cl. 179—100 4 Claims
Int. Cl. H04m *1/02, 1/11*

ABSTRACT OF THE DISCLOSURE

A telephone handset having a foot-stand upon which the apparatus rests in its normal position, and from which extends a handle ending in a head containing a receiver loudspeaker is provided. The foot-stand contains at least one microphone and a contact arranged to connect an amplifier in the receiver circuit when the contact-set is in an operated position and to disconnect or reduce the output of said amplifier when the contact set is in an unoperated position. A button for operating the contact projects from the base of the foot-stand so that when the handset rests in a predetermined position on a surface the button is depressed to operate the contact.

Figure 1:
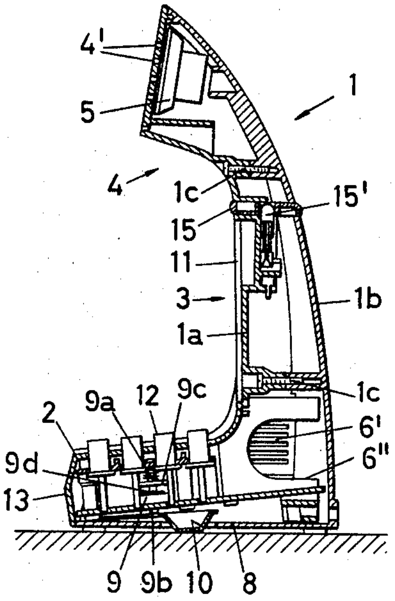

This invention concerns a telephone apparatus of the type which is meant to be placed on a desk or similar surface, and which is equipped in such a way as to be used as a loudspeaking and as a conventional lowspeaking telephone, especially intended for internal telephone systems, also called intercoms or office telephones. The apparatus is, however, equally applicable for use in public telephone systems with major or minor modifications of the apparatus for this application.

Several different constructions of combined loudspeaking and lowspeaking telephone apparatus are known, which optionally permit conversations either in a loudspeaking position with the incoming speech reproduced by a loudspeaker after amplification, the outgoing speech being picked up by a microphone at a certain distance from the user, or for conversations in lowspeaking position, in which case a normal telephone handset is used and those parts of the system incorporating amplifiers are cut out or reduced in effect.

Loudspeaking telephone apparatus are also known which are constructed as a box forming one unit with all the necessary components and electro-acoustical transformers arranged in a common housing or cover to be placed on a table; these apparatus may only be used as loudspeaking telephones. Such an apparatus may, however, be connected in parallel with a conventional telephone handset micro-telephone, so that the user may have the choice between two possibilities for conversation, i.e. loudspeaking or lowspeaking.

Further, conventional telephone apparatus for tables are known, which are made as one unit with all the necessary components and units arranged in one and the same housing. The usual shape for an apparatus of this type for the public telephone systems is the so-called "standing telephone handset" which consists of a foot-stand, from which mounts a handle ending in a head which head houses a lowspeaking telephone, whereas said foot-stand contains respectively a microphone and the necessary equipment for establishing connection and for signalling, also including a button protruding downwards from the bottom of the foot-stand, and controlling a contact-set having two positions which are determined by whether the button is physically influenced by a surface or not, i.e. whether it is in its inner or outer position.

This apparatus which may also be called "handset," stands in a resting or ready position on a surface, such as a table, and is, when it is to be used, i.e. connected to a link, lifted up to the user's head with the telephone, located in the head of the handle, held at the ear, and the foot-stand containing the microphone, kept near the mouth. The contact-set which is controlled by the button protruding downwards from the foot-stand, functions as the ordinary fork-contact.

When using loudspeaking telephone apparatus it may be desirable to change to conventional telephoning, for instance when the user does not want other parties present in the same room to listen to the incoming speech, or when a weak connection makes it difficult to use the apparatus in the loudspeaking position, or when there is much noise in one or both rooms, between which the conversation takes place. On the other hand, it often happens that the user, during a telephone conversation, finds it necessary to have both hands free for making notes, leafing through papers, etc., while the conversation is still going on. It is then profitable to use the apparatus as a loudspeaking telephone. None of the known or proposed loudspeaking telephone apparatus are so designed that they, without the use of accessory equipment, namely an ordinary hand-set, as mentioned above, so as to be able to combine said two ways of operation. One purpose of the invention is to provide a combined telephone apparatus to be placed on a table, and which in a convenient manner provides optionally loudspeaking and lowspeaking (conventional) telephoning, and with automatic switching of the apparatus between said two ways of operation.

A further purpose is to provide such a combined apparatus of an especially simple and inexpensive construction with a minimum of components and parts.

A still further purpose is to provide such a combined apparatus with advantageous internal arrangement of the electro-acoustical converters in order to reduce as much as possible the effects of acoustical feed-back between the microphone and the loudspeaker which is an especially important problem related to loudspeaking telephones.

The apparatus of the invention is of the type called "standing handset," and is so made that the apparatus, when standing on a surface and being in its normal position, functions as a loudspeaking telephone, and when the apparatus is in any other position, in which the mentioned button is not physically influenced, functions as a lowspeaking telephone.

This represents a novel application of such a contact-set. Connections with other subscribers may take place without the apparatus being lifted from the surface, so that said contact-set has no function in connection with establishment of outgoing or incoming calls in that the apparatus functions in the same manner as the mentioned intercom systems or office telephones for internal communication. When the apparatus is in normal position, i.e. stands on a surface, the speech is reproduced by the telephone acting as a loudspeaker and is heard in the entire room. Should it, however, be desirable to use the apparatus in the same manner as a conventional handset, the apparatus is only lifted from the surface, through which the contact set is switched, either cutting out the telephone amplifier or reducing its degree of amplification. In the case of conventional intercom systems or office telephone systems, these two possibilities for conversation are only possible if the apparatus standing on the table and acting as a loudspeaking telephone, is also equipped with and connected with an ordinary handset.

The mentioned contact-set is intentionally so connected to the speech- and control-circuits of the apparatus that, when the apparatus is in its normal position, it is kept in a state ready for calls but when the apparatus is brought from this position in any other position, it is blocked or made busy. However, when a call is made to the apparatus when same is in its normal position and the apparatus is then brought from said position to any other position, the button-operated contact-set will switch the telephone from loudspeaking to lowspeaking condition. By using the contact-set in this way, in addition to the above mentioned advantages, through a simple manipulation and with the aid of the same contact-set, it has been possible to cut out the apparatus for incoming calls thereby that the apparatus is brought in an abnormal position, such as turned over, so that the user at any time is aware of the situation and may bring the apparatus back to normal resting position when he is again prepared to receive calls or he himself wants to make a call.

Figure 2:
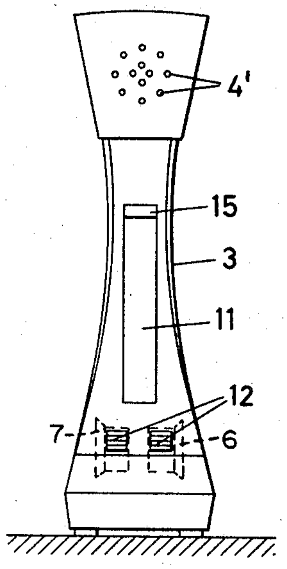
Figure 3:
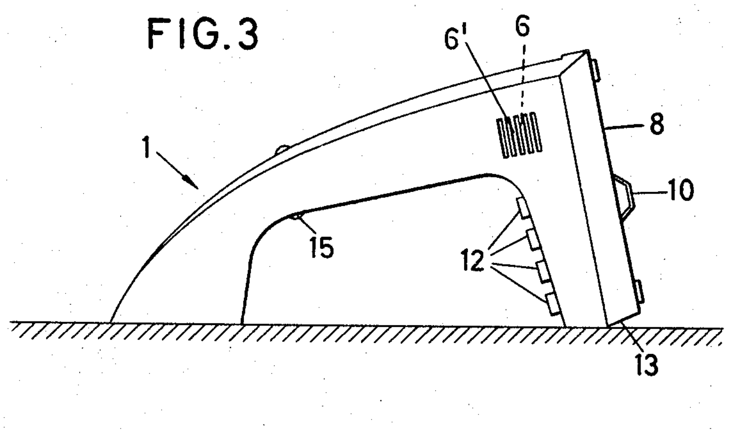

The invention will be described in detail in the following with reference to the drawing, in which:

FIG. 1 shows a vertical section of the apparatus, shaped as a standing handset, and designated for use as combined loudspeaking and lowspeaking telephone, FIG. 2 shows the apparatus according to FIG. 1 seen from the rear, and FIG. 3 shows the apparatus according to FIGS. 1 and 2 placed in another stable position on a surface.

In the drawings 1 designates the actual apparatus housing or case which includes a foot-stand 2, and a stem or handle 3 pointing upwards from said foot-stand and ending in a head 4. Said housing is composed of a front part 1*a* and a back- and bottom-part 1*b* held together by screws of which two numbered 1*c* are visible. The head 4 contains a loudspeaking telephone 5, the axis of which is in the plane of symmetry of the apparatus, and points forward for the best reproduction of incoming speech through sound outlets 4' in the head 4. In the foot-stand 2 and especially near its walls there are, as indicated in FIG. 2, two microphones 6 and 7 which are placed at either side of the foot-stand and symmetrically located about the mid-plane of the housing. As appears in FIG. 1, the front part 1*a* is formed with two U-shaped brackets pointing rearwards, of which only the one 6'' forming a rest for the right microphone 6, is shown. A similar bracket is placed at the left half of the housing, i.e. on the other side of the vertical mid-plane. Together with the respective side walls of the housing which are shaped with ribbed openings 6', these brackets form compartments or wells for the microphones 6 and 7. Said two microphones 6 and 7 are electrically connected out-of-phase, so that identical sound signals which reach both microphones simultaneously will not give a resulting output signal. Direct sound from the loudspeaker will not result in the microphones giving together output signals, as they are placed symmetrically to and at equal distances from the loudspeaker. Thereby the effect of the accoustical feedback between the loudspeaker and the microphones is reduced to a large extent. Speech in the room, e.g. from the subscriber will, however, be transmitted, as this in general will not influence the two microphones with exactly the same force, so that resulting output signal is obtained.

On the foot-stand 2 there are further placed operation buttons 12 for establishment of connections and other functions. Instead of the mentioned buttons one may naturally use a conventional dial etc., as on ordinary telephone apparatus to be connected to the public telephone systems.

Further, the drawing shows a switch contact-set 9 with a control means in the shape of a button 10 which protrudes downwards from the bottom plate 8 of the foot-stand 2 and is arranged to be pushed upwards when pressed against a surface by the apparatus being placed on said surface in its normal speech or resting position (see FIGS. 1 and 2).

The contact-set 9 of the switch is used both for switching the telephone apparatus from loudspeaking to lowspeaking condition by changing the amplification of the incoming and/or outgoing speech signals, as well as for cutting out the apparatus for incoming calls, as mentioned above.

Said contact-set consists of a helical spring 9*a* placed around and influenced by a pin 9*b* which supports a plate 9*c*, and of counter contacts 9*d*. Contact 9 in FIGURE 1 is a break contact, i.e. it is closed when button 10 is not influenced by the surface upon which the apparatus may rest, such as when it is lifted or tilted as shown in FIG. 3.

FIG. 1 further shows that on the stem or handle 3 there is placed a signal lamp 15' for indication of calls to the apparatus. Said signal lamp 15' is preferably so placed that it illuminates a transparent, appropriately coloured (red) lens 15 which gives a light signal visible from all sides of the apparatus. Finally, on the front of the stem which is conveniently shaped with an approximately flat, vertical part, there is mounted a frame 11 for a list of the most frequently used subscriber numbers, this being especially convenient on apparatus used in internal office telephone systems.

It should be mentioned at this point that it is naturally important to use as small and light components and parts as possible in the construction of the apparatus, as same, when used as a lowspeaking telephone, is lifted to a suitable position in relation to the ear and the mouth of the user, just as is the case with the conventional handset. The apparatus should, therefore, not be heavy.

The contact-set 9 of the switch is automatically switched when the apparatus is lifted from the surface, and this switching is, as previously mentioned, used for cutting out the subscriber's amplifier or reducing its degree of amplification to suit conventional telephoning Depending upon the system of the telephone network or the central to which the apparatus is connected, the switch contact-set may also have other functions. For apparatus used in public telephone systems, it is, for instance, necessary to switch the apparatus from receiving position, i.e. ready to receive calls, to a speech position, i.e. lowspeaking or loudspeaking position which in certain cases will require one or more buttons in addition to the switching device; the contact-set is especially used for cutting out the apparatus for incoming calls, for which purpose the apparatus is intentionally shaped in such a way that it may be placed in another stable position on a plane, horizontal surface, i.e. the position which is shown in FIG. 3, and which is suitably called the cut-out position, in which the contact-set 9 causes a busy signal to appear in the telephone central to indicate that the user does not wish incoming calls. It is also possible to arrange a second switching device similar to the contact-set 9 on the front plate 13 of the foot-stand 2; this second switching device is influenced in a similar way as the first mentioned, when the apparatus is placed in a cut-out position.

As appears from the drawing, especially FIG. 3, the front 13 and the forward-facing plate of the head 4 are located in the same plane. This is, of course, not the only possible design for obtaining a stable cut-out position for the apparatus placed on a surface. In the case of an apparatus designed as a box or case, as mentioned in the introduction, the cut-out position may for instance in the troduction, the cut-out position may fore instance be a position in which the apparatus is tilted sideways. In all cases, the apparatus may easily be grasped by the hand and lifted from the surface to be used as a conventional handset, or as loudspeaking telephone.

What I claim is:

1. A telephone handset comprising a foot-stand upon which the apparatus rests in its normal position, and from which extends a handle ending in a head containing a receiver loudspeaker, the foot-stand containing at least one microphone, a contact set arranged to connect an amplifier in the receiver circuit when the contact-set is in an operated position and to reduce the output of said amplifier when the contact set is in an unoperated position, and a button for operating the contact-set which button projects from the base of the foot-stand so that when the handset rests in a predetermined position on a surface the button is depressed to operate the contact set.

2. A telephone handset according to claim 1, wherein two microphones are provided in said foot-stand.

3. A telephone handset according to claim 2, wherein the two microphones are connected out-of-phase and are at the same distance on either side of the mid-plane of the handset.

4. A telephone handset according to claim 1, wherein the head has a flat surface in the same plane as a flat surface formed on a part of said foot-stand whereby the handset may assume a stable position when resting on said flat surfaces.

References Cited

UNITED STATES PATENTS 2,885,478 6/1968 Cerofolini.

KATHLEEN H. CLAFFY, *Primary Examiner.*

A. McGILL, *Assistant Examiner.*

U.S. Cl. X.R.

179—1, 103